United States Patent [19]

Mizoguchi et al.

[11] Patent Number: 5,005,185

[45] Date of Patent: Apr. 2, 1991

[54] PARALLEL MODE ADAPTIVE TRANSVERSAL EQUALIZER FOR HIGH-SPEED DIGITAL COMMUNICATIONS SYSTEM

[75] Inventors: Shoichi Mizoguchi; Hideki Matsuura, both of Tokyo, Japan

[73] Assignee: NEC Corporation, Tokyo, Japan

[21] Appl. No.: 467,580

[22] Filed: Jan. 19, 1990

[30] Foreign Application Priority Data

Jan. 19, 1989 [JP] Japan .................................. 1-10270

[51] Int. Cl.$^5$ ............................................. H04L 27/01
[52] U.S. Cl. ................................... 375/15; 364/724.2; 375/16
[58] Field of Search ...................... 333/17.1, 18, 28 R; 364/724.01, 724.16, 724.19, 724.2; 375/11, 12, 15, 16

[56] References Cited

U.S. PATENT DOCUMENTS

| | | | |
|---|---|---|---|
| 4,594,725 | 6/1986 | Desperben et al. ................... | 375/15 |
| 4,635,276 | 1/1987 | Karabinis ............................... | 375/16 |
| 4,716,577 | 12/1987 | Oexmann ............................... | 375/15 |
| 4,829,543 | 5/1989 | Borth et al. ........................... | 375/15 |

Primary Examiner—Benedict V. Safourek
Attorney, Agent, or Firm—Sughrue, Mion, Zinn, Macpeak & Seas

[57] ABSTRACT

In a parallel-mode adaptive transversal equalizer, P- and Q-channel data streams from A/D converters (1, 5) are respectively passed through the tapped-delay lines of trasversal filters (2, 6), on the one hand, and are one-symbol delayed, on the other, by delay circuits (3, 7, 66, 67) to produce $(N-1)$ successively delayed P- and Q-channel data streams, which are respectively passed through the tapped delay lines of transversal filters (4; 63, 8; 64). In each trasversal filter, symbols appearing at successive taps of the tapped-delay line are sampled and held for a duration of N symbols to produce first and second groups of stored symbols, the stored symbols of the first group being multiplied by first tap weights and summed, producing N first equalized outputs for each channel. The stored symbols of the second are multiplied by second tap weights and summed, producing N second equalized outputs for each channel. The first equalized outputs of each channel are respectively combined by adders (10-14, 68, 69) with the second equalized outputs of the otehr channel and multiplexed (14, 15) into P- and Q-channel outputs. Correlations are detected by correlators (16-19, 70, 72) between data and error components of each of the P- and Q-channel outputs to control the first variable tap weights of associated tapped-delay lines, and correlations are detected by correlators (20-23, 71, 73) between data components of one of the P- and Q-channel outputs and error components of the other channel output to control the second variable tap weights of associated tapped-delay lines.

3 Claims, 5 Drawing Sheets

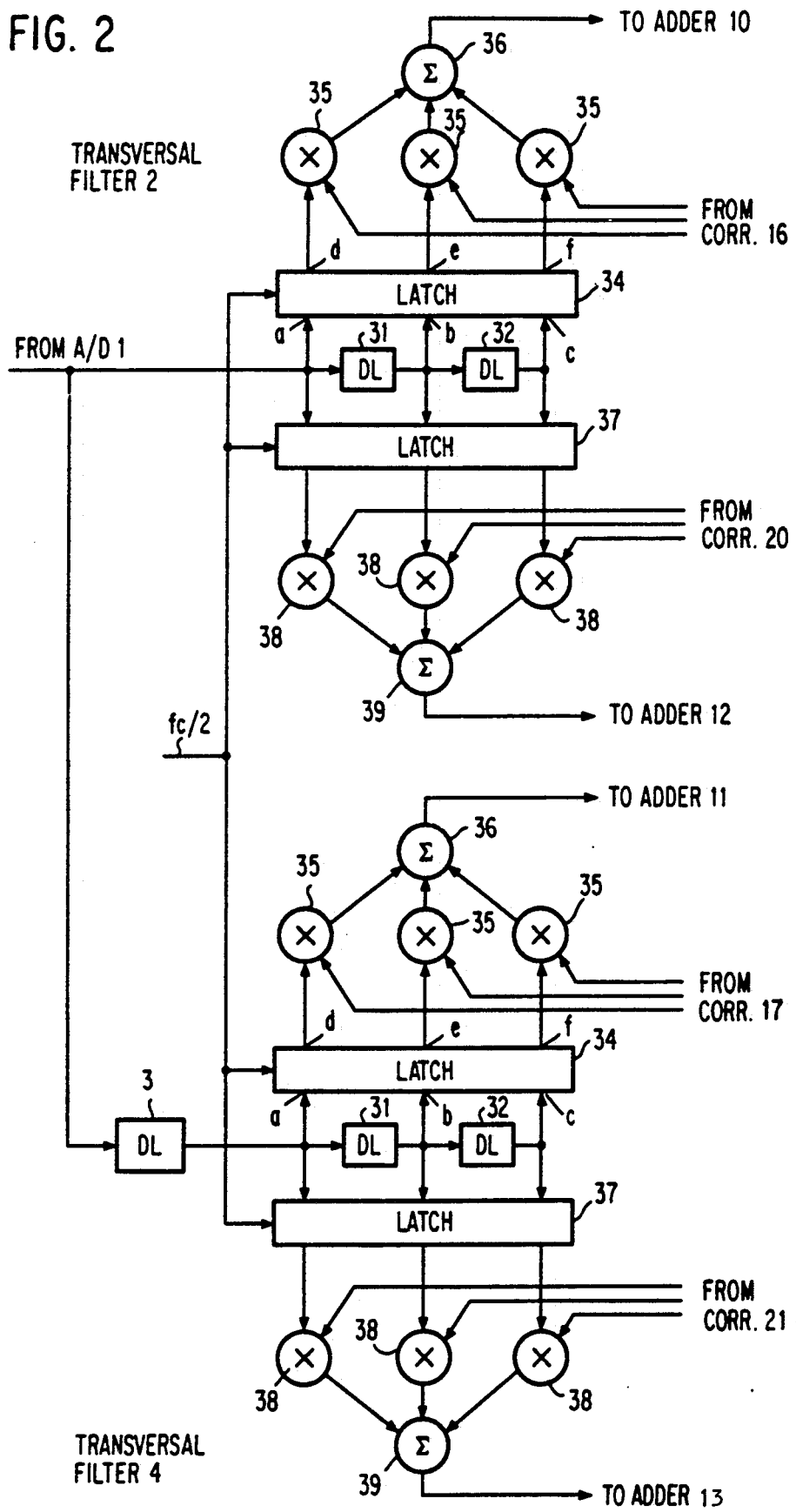

INPUT DATA STREAMS OF LATCH 34 OF FILTER 2 (OR 6)

INPUT DATA STREAMS OF LATCH 34 OF FILTER 4 (OR 8)

OUTPUT DATA STREAMS OF LATCH 34 OF FILTER 2 (OR 6)

OUTPUT DATA STREAMS OF LATCH 34 OF FILTER 4 (OR 8)

PARALLEL MODE ADAPTIVE TRANSVERSAL EQUALIZER FOR HIGH-SPEED DIGITAL COMMUNICATIONS SYSTEM

BACKGROUND OF THE INVENTION

The present invention relates generally to adaptive transversal equalizers, and more specifically to an adaptive transversal equalizer capable of operating at the speed of digital communications systems.

Transversal equalizers are used for equalization of a digitally demodulated signal, and development efforts are being directed to digitizing transversal equalizers to meet the recent requirements that include compactness, low power consumption and free of adjustments.

Prior art all digital transversal equalizers comprise a digital transversal filter and a tap-weight control circuit, or correlator. The digital transversal filter includes a tapped-delay line to which a digital signal is supplied from the A/D converter of a demodulator. The tapped-delay line has $(2M+1)$ successive taps (where M is an integer equal to or greater than unity) to which multipliers are respectively connected to multiply the symbols at the taps with respective tap-weight control signals supplied from the control circuit, the outputs of the multipliers being summed by an adder to produce an equalized signal. The correlator includes $(2M+1)$ exclusive OR gates for detecting correlation between the data and error components contained in the equalized output, and integrators for integrating the outputs of the exclusive OR gates for a certain symbol interval and averaging the integrated values to produce the tap-weight control signals to adjust the tap weights at the intervals of the symbols supplied to the tapped-delay line to adaptively equalize the data signal.

However, there is an upper limit that is imposed on the maximum operating speed of the correlator and on the maximum operating speed of LSI circuits that comprise the multipliers and adder of the transversal filter. Since the recent digital communications system demands ever-increasing speed which is higher than the operating speed of the current LSI circuit, the prior art all digitized transversal equalizer is not capable of meeting the demand of the digital communications system. Therefore, with the current digital technique, the integrators of such correlators have to be implemented in analog form to meet the high speed requirements of the digital communications system.

SUMMARY OF THE INVENTION

It is therefore an object of the present invention to provide an adaptive transversal equalizer which is capable of operating at a speed higher than the maximum operating speed of LSI chips.

In the demodulator of a digital communications system, a P-channel (in-phase channel) baseband signal and a Q-channel (quadrature-channel) baseband signal are derived from a received digitally modulated signal using quadrature demodulation technique and a clock signal synchronized with symbols contained in the baseband signals are recovered. P-channel and Q-channel analog-to-digital (A/D) converters are provided for converting the P-channel and Q-channel baseband signals, respectively, into P-channel and Q-channel digital data streams.

According to the present invention, the P- and Q-channel data streams are decomposed into N sequences (where N is an integer equal to or greater than 2) so that they propagate in parallel mode at the speed of LSI circuits and are recombined at the outputs.

The adaptive transversal equalizer of this invention includes a frequency divider for dividing the frequency of the clock signal by N to produce a sequence of lower-frequency clock pulses, where N is an integer equal to or greater than two. $(N-1)$ P-channel delay circuits are provided for delaying the P-channel digital data stream by one symbol interval to produce $(N-1)$ successively delayed P-channel data streams, and $(N-1)$ Q-channel delay circuits are provided for delaying the Q-channel digital data stream by one symbol interval to produce $(N-1)$ successively delayed Q-channel data streams. N P-channel transversal filters and N Q-channel transversal filters are provided, each of which comprises a common tapped-delay line, and a latch having inputs respectively connected to successive taps of the tapped-delay line, the latch being clocked by the output of the frequency divider for sampling and holding symbols at the successive taps of the delay line for a duration of N-symbol intervals. In each transversal filter, there are provided a first group of variable tap-weight multipliers and an adder and a second group of variable tap-weight multipliers and an adder, the inputs of the tap-weight multipliers of each group being coupled respectively to the outputs of the latch and their outputs being summed by the adder of the same group to produce first and second equalized outputs from each transversal filter. The tapped-delay line of one of the transversal filters of each channel is connected to the output of the A/D converter of the same channel, while the tapped-delay lines of the other transversal filters of each channel are connected respectively to the output of the delay circuits of the same channel. The first equalized outputs of the transversal filters of each channel are combined with the second equalized outputs of corresponding transversal filters of the other channel and multiplexed into a P-channel output and a Q-channel output. N pairs of P-channel correlators are associated respectively with the P-channel transversal filters and N pairs of Q-channel second correlators are associated respectively with the Q-channel transversal filters. One of the correlators of each of the N pairs detects a correlation between data and error components of the P-channel output for controlling the first variable tap-weight multipliers of the associated transversal filter, and the other of the correlators of each of the N pairs detects a correlation between a data component of one of the P- and Q-channel outputs and an error component of the other channel output for controlling the second variable tap-weight multipliers of the associated transversal filter.

BRIEF DESCRIPTION OF THE DRAWINGS

The present invention will be described in further detail with reference to the accompanying drawings, in which:

FIG. 2 is a circuit diagram showing details of the transversal filters 2 and 4 of FIG. 1;

DETAILED DESCRIPTION

Figure 1:
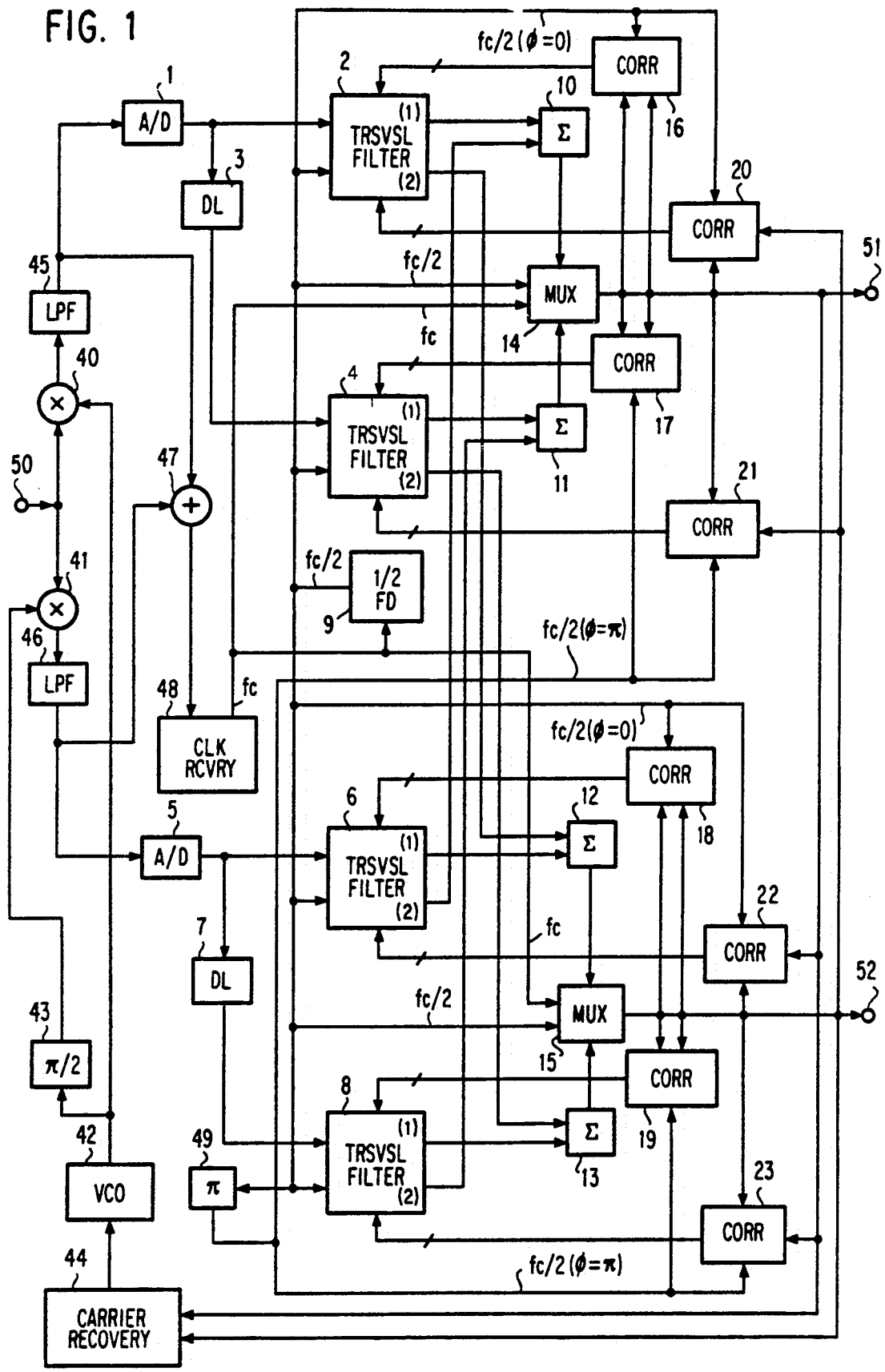
FIG. 1 is a block diagram of an adaptive transversal equalizer of the present invention in a two-parallel mode.
Figure 3A:
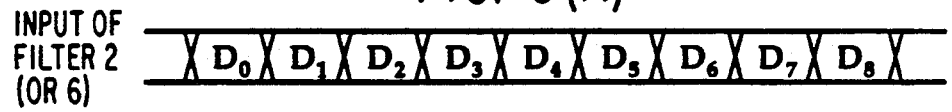
FIG. 3 is a timing diagram useful for describing the states of symbols appearing in FIG. 2.
Figure 3B:
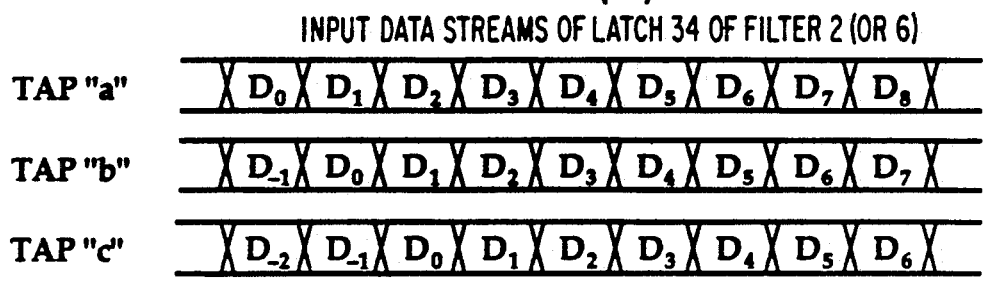
Figure 3C:
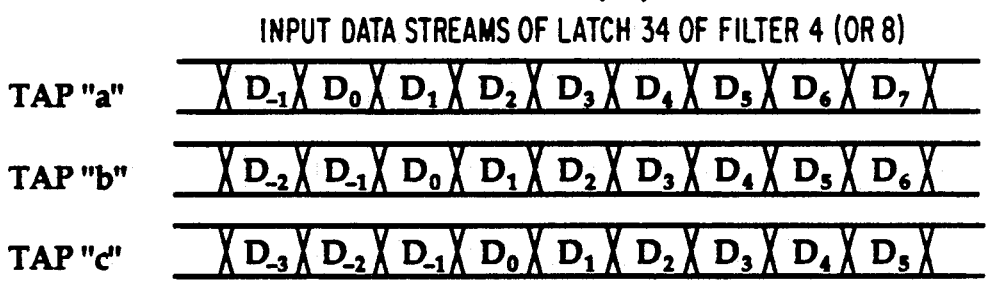
Figure 3D:
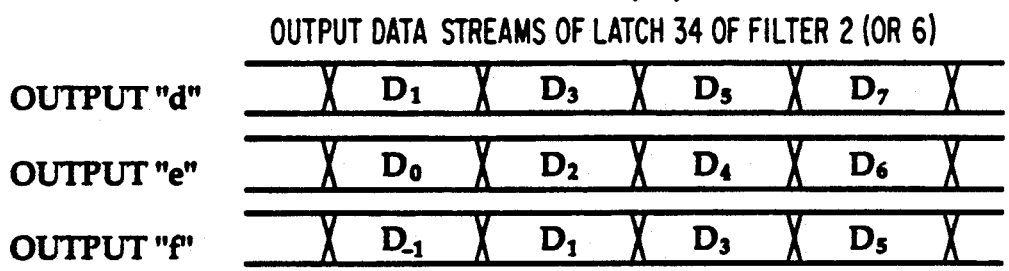
Figure 3E:
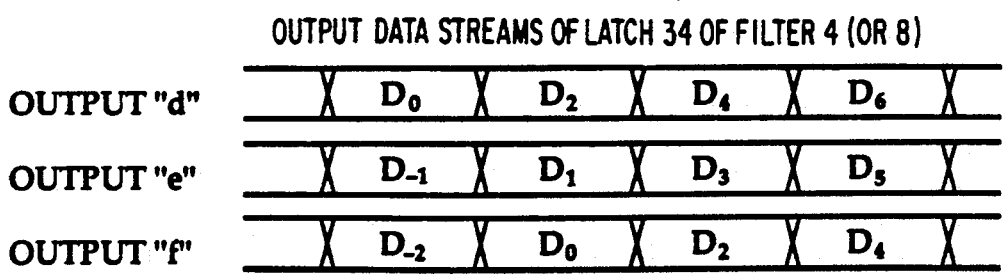

Referring now to FIG. 1, there is shown an adaptive transversal equalizer of the present invention for use with a demodulator of a digital communications system. The adaptive transversal equalizer generally comprises three-tapped, two-dimensional transversal filters 2, 4, 6 and 8. As will be described in detail later, each transversal filter is provided with a common tapped delay line having three successive taps, for example, and a pair of latched coupled to the taps of the delay line to apply signals at the taps to multipliers of different sets at one half the rate of the clock pulse recovered by the demodulator where the signals are multiplied by tap weight coefficients. The outputs of the multipliers of each set are summed to produce a pair of equalized signals from each transversal filter.

The demodulator is a well-known circuit in which the received signal (be it in PSK or QAM format) is applied through terminal 50 to multipliers, or mixers 40 and 41. A voltage controlled oscillator 42 supplies the in-phase version of a local carrier to mixer 40 to produce an in-phase output as a P-channel digital baseband signal, and a $\pi/2$ phase shifter 43 supplies the quadrature version of the local carrier to mixer 41 to produce a quadrature output as a Q-channel digital baseband signal. VCO 42 is controlled by a signal which is derived by a carrier recovery circuit 44 of a known design from signals which appear at P-channel and Q-channel output terminals 51 and 52. The outputs of mixers 40 and 41 are respectively passed through low-pass filters 45 and 46 and combined, on the one hand, by an adder 47 for coupling to a known clock recovery circuit 48, and supplied, on the other, to analog-to-digital converters 1 and 5, respectively.

A/D converter 1 samples the low-pass filtered, multilevel of the P-channel signal and quantizes the samples into a multibit code as a P-channel digital signal. The output of A/D converter 1 is applied to the input of the tapped delay line of transversal filter 2 on the one hand, and passed, on the other, through a one-symbol delay line 3 to the input of the tapped delay line of transversal filter 4.

Referring to FIG. 2, transversal filter 2 comprises a common tapped delay line consisting of unit delay elements, or shift registers 31 and 32 successively connected to the output of A/D converter 1 to define an odd number of taps, say, three taps. These taps are connected respectively to input terminals a, b and c of a latch 34. Output terminals d, e and f of the latch 34, which correspond to the input terminals a, b and c, are connected respectively to tap weight multipliers 35 to which tap weight control signals are respectively supplied from an cross-correlator 16. The outputs of multipliers 35 are summed in an adder 36 and supplied to an adder 10 as a first output of transversal filter 2. Transversal filter 2 further includes a similar set of a latch 37, tap-weight multipliers 38 and an adder 39. Latch 37 has its input terminals respectively coupled to the successive taps of the common delay line and has its output terminals respectively coupled to the tap-weight multipliers 38 to which control signals are supplied respectively from a cross-correlator 20. The outputs of multipliers 38 are summed by adder 39 and fed to an adder 12 as a second output of transversal filter 2. Latches 34 and 37 are both driven by the lower frequency clock from divide-by-two frequency divider 9.

In like manner, transversal filter 4 is of the same construction to filter 2 but it takes its input digital signal from the output of the one-symbol delay line 3. Transversal filter 4 supplies its first output from its adder 36 to an adder 13 and its second output from its adder 39 to an adder 13. The tap weights of the multipliers 35 and 38 of filter 4 are respectively controlled by signals from an cross-correlator 17 and a cross-correlator 21.

Returning to FIG. 1, the first output of transversal filter 2 is summed with the second output of transversal filter 6 by the adder 10 and the second output of transversal filter 2 is summed with the first output of transversal filter 6 by the adder 12. Likewise, the first and second outputs of transversal filter 4 are respectively summed with the second output of transversal filter 8 by the adder 11 and the first output of transversal filter 6 by the adder 13.

Stated differently, each of the P- and Q-channels of the equalizer has first and second transversal filters. The first output of the first transversal filter of the P-channel is summed with the second output of the first transversal filter of the Q-channel, and the second output of the first transversal filter of the P-channel is summed with the first output of the first transversal filter of the Q-channel. Likewise, the first output of the second transversal filter of the P-channel is summed with the second output of the second transversal filter of the Q-channel, and the second output of the second transversal filter of the P-channel is summed with the first output of the second transversal filter of the Q-channel.

On the Q-channel side of the adaptive equalizer, transversal filters 6 and 8 correspond respectively to transversal filters 2 and 4, respectively. Namely, the transversal filter 6 processes the output of A/D converter 5 which samples the low-pass filtered, multilevel of the Q-channel signal and quantizes the samples into a multibit code as a Q-channel digital signal. The output of A/D converter 5 is delayed by a one-symbol delay line 7 and supplied to transversal filter 8. The tap weight control signals for transversal filter 6 are supplied from an cross-correlator 18 and a cross-correlator 22, and those for transversal filter 8 are supplied from an cross-correlator 19 and a cross-correlator 23.

The outputs of P-channel adders 10 and 11 are supplied to a parallel-to-serial converter, or multiplexer 14, and the outputs of Q-channel adders 12 and 13 are coupled to a multiplexer 15. The outputs of multiplexers 14 and 15 are connected respectively to the output terminals 51 and 52. The clock pulse recovered by clock recovery circuit 48 is at a frequency fc which is divided by a divide-by-2 frequency divider 9 to produce a lower frequency clock at fc/2 which is supplied to the latches of all transversal filters 2, 4, 6 and 8. Multiplexers 14 and 15 are supplied with the lower-frequency clock in order to receive output signals from the associated adders and are supplied with the higher-frequency clock to combine them into a single bit stream.

A phase shifter 49 is connected to the output of divide-by-2 frequency divider 9 to delay the lower-frequency clock by $\pi$ radian so that the delayed lower-frequency clock is opposite in phase to the nondelayed lower-frequency clock. The zero-phase lower-frequency clock is supplied to the cross-correlators 16, 18, 20 and 22, and the $\pi$-phase lower-frequency clock is supplied to the cross-correlators 17, 19, 21 and 23, so that P-channel correlators 16, 20 and Q-channel correlators 18, 22 operate synchronously with desired components of the outputs of transversal filters 2 and 6, while P-channel correlators 17, 21 and Q-channel correlators 19, 23 operate synchronously with desired components of the outputs of transversal filters 4 and 6.

Each of the correlators includes a shift register for delaying the input by predetermined symbol intervals and (2M+1) exclusive OR gates coupled to the stages of the shift register. The output of the exclusive OR gates are combined and integrated over a predetermined duration by counters to produce tap weight control signals.

Since correlators 16 and 20 are driven by the zero-phase lower-frequency clock, cross-correlator 16 detects correlation between data and error components which are both derived through P-channel multiplexer 14 and produce tap weight control signals to the multipliers 35 of transversal filter 2 at the rate of lower-frequency clock. Whereas, cross-correlator 20 provides detection of correlation between error components which are derived through P-channel multiplexer 14, on the one hand, and data components which are derived through Q-channel multiplexer 15, on the other, and supplies tap weight control signals to the multipliers 38 of transversal filter 2 at the lower-frequency clock timing.

Since the data inputs of transversal filters 4 and 8 are delayed one-symbol interval with respect to those of transversal filters 2 and 6, and since correlators 17 and 21 are clocked with the $\pi$-phase lower-frequency clock, cross-correlator 17 detects correlation between data and error components which are derived through P-channel multiplexer 14, whereas cross-correlator 21 provides detection of correlation between error components which are derived through P-channel multiplexer 14, on the one hand, and data components which are derived through Q-channel multiplexer 15, on the other.

It is seen therefore that cross-correlator 18 detects correlation between data and error components which are derived through Q-channel multiplexer 15, whereas cross-correlator 22 detects correlation between error components which are derived through Q-channel multiplexer 15, on the one hand, and data components which are derived through P-channel multiplexer 14, on the other. Likewise, cross-correlator 19 detects correlation between data and error components which are derived Q-channel multiplexer 15, whereas cross-correlator 23 provides detection of correlation between error components which are derived through Q-channel multiplexer 15, on the one hand, and data components which are derived through P-channel multiplexer 14, on the other.

A timing diagram shown in FIG. 3 illustrates the timing relationships between symbols, or bits appearing at the input digital data stream supplied to transversal filter 2 or 6 and those appearing in the latch 34 of transversal filters 2, 4, 6 and 8. The input digital data stream supplied to filter 2 or 6 is shown in part (A) of FIG. 3. As shown in part (B) of FIG. 3, because of the one-symbol delay elements 31 and 32, the input symbols appear at the successive taps a, b and c of the latch 34 of filter 2 (or 6) as a series of symbols $D_0$ to $D_8$ at tap a, a series of symbols $D_{-1}$ to $D_7$ at tap b, and a series of symbols $D_{-2}$ to $D_6$ at tap c. Whereas, in transversal filter 4 (or 8), the series of symbols which appear at taps a, b and c are delayed one symbol interval with respect to the corresponding series of transversal filters 2 (or 6) as shown in part (C) of FIG. 3 because of the one-symbol delay by delay line 3 (or 7). Since the latches of all transversal filters are driven at one half the rate of the incoming data stream, a series of symbols $D_1$, $D_3$, $D_5$ and $D_7$ appear at output terminal d of latch 34 which corresponds to tap a, a series of symbols $D_0$, $D_2$, $D_4$ and $D_6$ appear at output terminal e which corresponds to tap b, and a series of symbols $D_{-1}$, $D_1$, $D_3$ and $D_5$ appear at output terminal f corresponding to tap c (as shown in part (D) of FIG. 3). Whereas, in transversal filter 4 (or 8), the series of symbols which appear at taps d, e and f are delayed one symbol interval with respect to the corresponding series of transversal filters 2 (or 6) as shown in part (E) of FIG. 3.

While mention has been made of an embodiment in which the equalizer is operated in a two-parallel mode by processing each of the channels by two identical transversal filters and driving them at one half the rate of incoming data symbols, the present invention could equally be modified to operate the equalizer at any submultiples of the incoming symbol rate.

Figure 4:
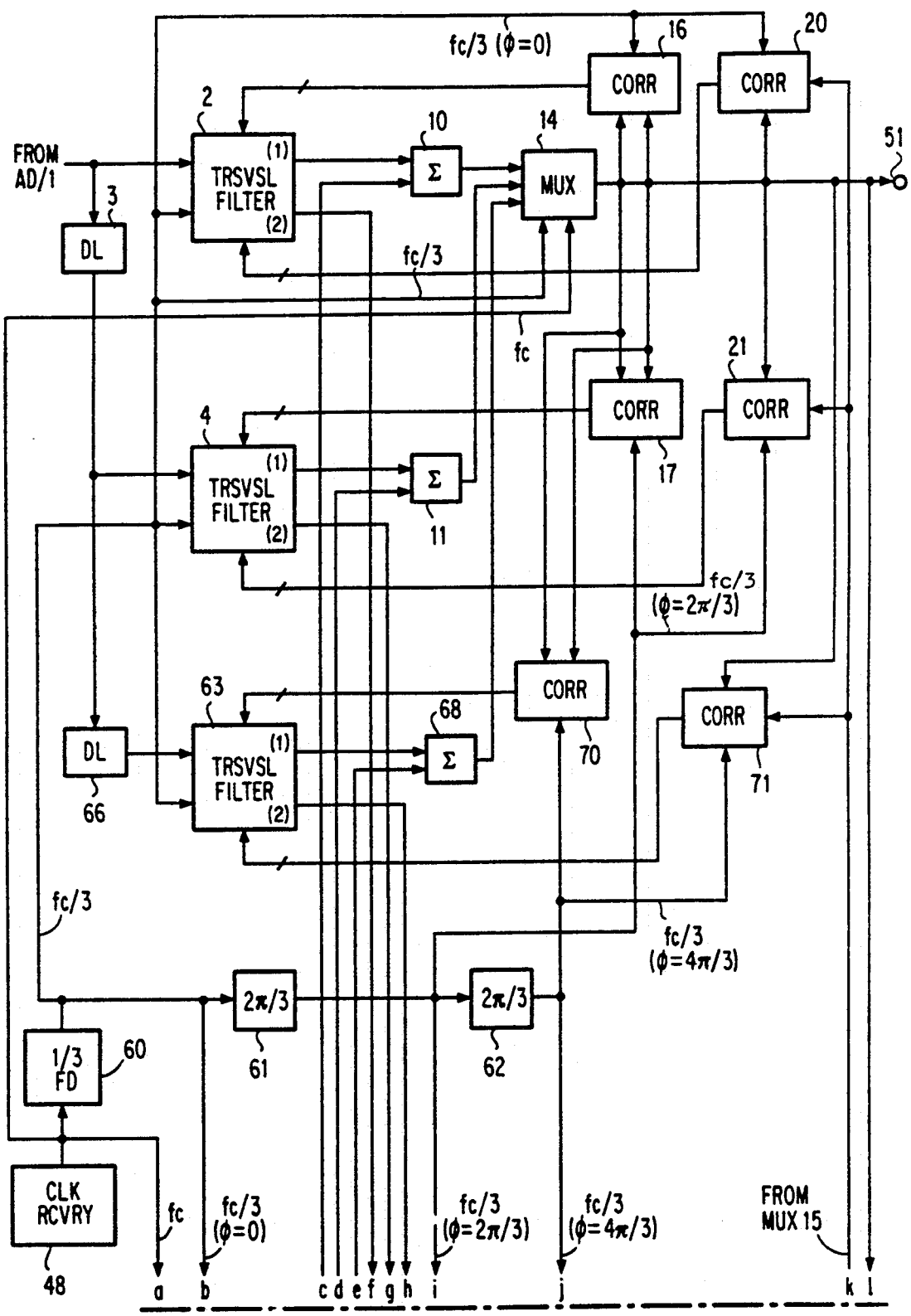
FIGS. 4A and 4B are block diagrams of an adaptive transversal equalizer of the invention operating in a three-parallel mode.
Figure 4B:
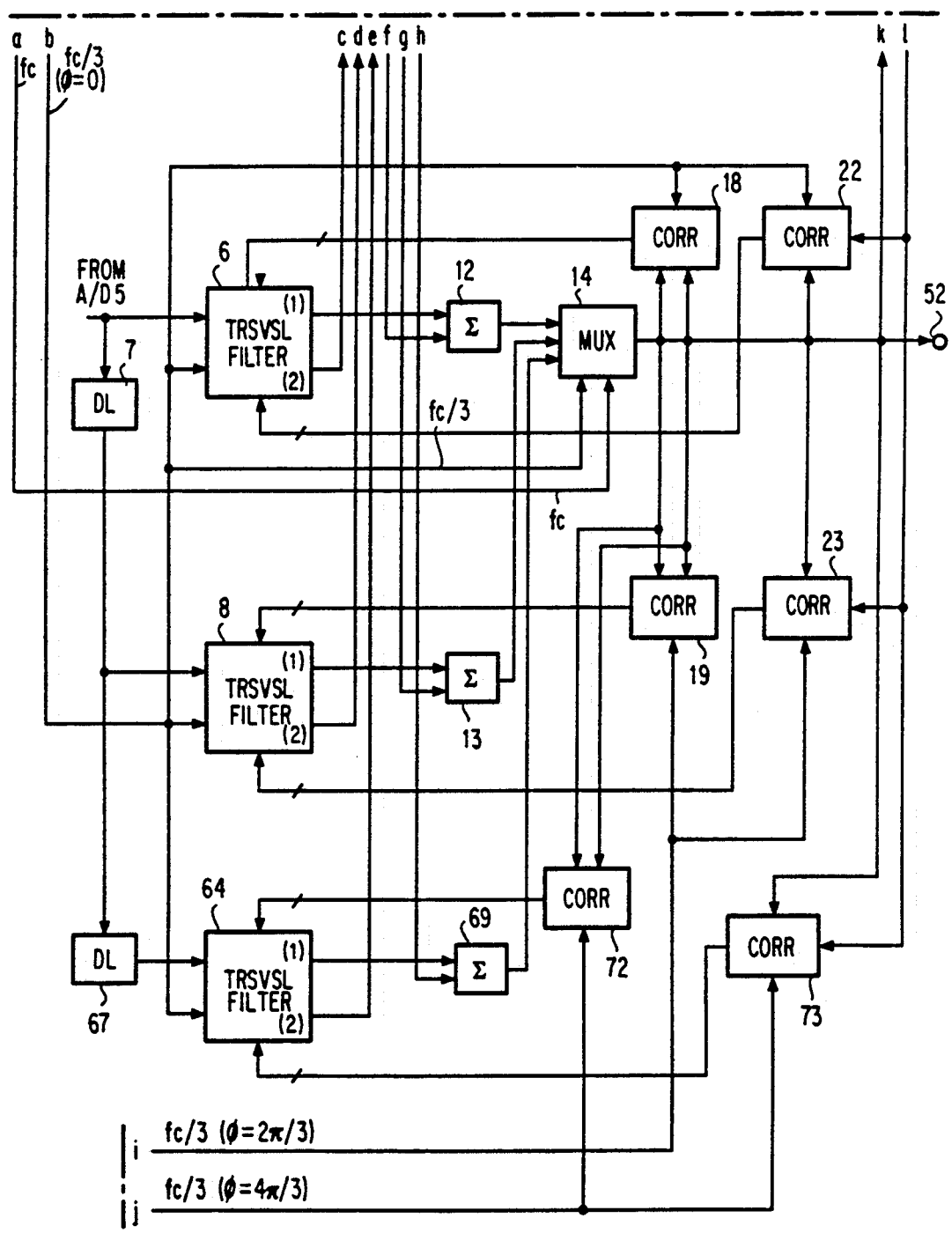

FIGS. 4A and 4B shows an adaptive equalizer which operates in a three-parallel mode by processing each channel with a set of three transversal filters. It is seen that the divide-by-two frequency divider 9 of FIG. 1 is replaced with a divide-by-three frequency divider 60 to produce a clock pulse at frequency fc/3, and the $\pi$ phase shifter 49 is replaced with two $2\pi/3$ phase shifters 61 and 62. Additionally included are transversal filters 63, 64, one-symbol delay lines 65, 66, adders 68, 69 and cross-correlators 70, 71, 72 and 73.

One-symbol delay lines 66 and 67 are respectively connected from the outputs of delay lines 3 and 7 to the data input terminal of transversal filters 63 and 64. Adder 68 sums the first output of transversal filter 63 with the second output of transversal filter 64, and adder 69 sums the first output of transversal filter 64 with the second output of transversal filter 63. The outputs of adders 68 and 69 are respectively supplied to multiplexers 14 and 15, each of which are clocked with the output of divide-by-three frequency divider 60 for receiving their inputs and driven by the higher, original clock frequency for multiplexing the inputs. Correlators 17, 20, 19 and 23 are clocked by the $2\pi/3$-phase of the clock which is one-third of the clock frequency derived from the clock recovery circuit, and correlators 70, 71, 72 and 73 are clocked by the $4\pi/3$-phase of the $\frac{1}{3}$-clock frequency.

In summary, this invention provides an adaptive transversal equalizer which comprises a divide-by-N frequency divider (9, 60) for dividing the frequency of the clock signal from the clock recovery circuit 48 by N to produce a sequence of zero-phase lower-frequency clock pulses, where N is an integer equal to or greater than two, a phase shifter (49; 61, 62) for shifting the phase of the lower-frequency clock pulses to produce (N−1) sequences of phase-shifted clock pulses; (N−1) P-channel delay circuits (3; 66) for delaying the P-channel digital data stream from P-channel A/D converter 1 by one symbol interval to produce (N−1) successively delayed P-channel data streams, and (N−1) Q-channel delay circuits (7; 67) for delaying the Q-channel digital data stream from Q-channel A/D converter 5 by one symbol interval to produce (N−1) successively delayed Q-channel data streams; N P-channel transversal filters (2, 4, 63) and N Q-channel transversal filters (6, 8, 64). Each of the transversal filters comprises a tapped-delay line (31, 32), latch means (34, 37) having inputs respectively connected to the successive taps of the tapped-delay line and clocked by the output of the frequency divider to hold symbols for a duration of N-symbol intervals, first variable tap-weight multipliers (35) coupled respectively to the outputs of the latch means (34), a first adder (36) for summing the outputs of the first tap-weight multipliers (35) to produce a first equalized output, second variable tap-weight multipliers (38) coupled respectively to the latch means (37), and a second adder (39) for summing the outputs of the second tap-weight multipliers (37) to produce a second equalized output. The tapped-delay line of one of the transversal filters of each of the channels (i.e. filter 2 or 6) is connected to the output of the A/D converter (i.e., 1 or 5) of the same channel, the tapped-delay lines of the other transversal filters of each of the channels being connected respectively to the output of the delay means of the same channel. N P-channel adders (10, 11, 68) are associated respectively with the N transversal filters (2, 4, 63, 6, 8, 64) of each channel, and N Q-channel adders (12, 13, 69) are associated respectively with the N transversal filters of each channel so that each of these adders sums the first equalized output of the associated transversal filter of one of the channels with the second equalized output of the associated transversal filter of the other channel. The P-channel multiplexer (14) multiplexers the outputs of the P-channel adders (10, 11, 68), and a Q-channel multiplexer (15) multiplexes the outputs of the Q-channel adders (2, 13, 69). N pairs of P-channel correlators (16, 20; 17, 21; 70, 71) are associated respectively with the P-channel transversal filters (2, 4, 63) and further associated with the P-channel multiplexer (14), and N pairs of Q-channel second correlators (18, 22; 19, 23; 72, 73) are associated respectively with the Q-channel transversal filters (6, 8, 64) and further associated with the Q-channel multiplexer (15), one pair of the correlators of each of the channels (i.e., correlators 16, 20; 18, 22) being clocked with the zero-phase lower-frequency clock signal, and the other pairs of the correlators of each of the channels (i.e., correlators 17, 21; 70, 71; 19, 23; 72, 73) being respectively clocked with the (N−1) sequences of phase-shifted lower-frequency clock pulses. The arrangement is such that one of the correlators of each of the N pairs (i.e., correlators 16, 17, 18, 19, 70, 72) detects a correlation between data and error components of an output signal from the associated multiplexer (14, 15) for controlling the first variable tap-weight multipliers (35) of the associated transversal filter (2, 6), and the other of the correlators of each of the N pairs (i.e., correlators 20, 21, 71; 22, 23, 73) detects a correlation between error components of the output signal from the associated one of the multiplexers (i.e., multiplexer 14 for correlators 20, 21, 71; and multiplexer 15 for correlators 22, 23, 73) and data components of an output signal from the other of the multiplexers (i.e., multiplexer 15 for correlators 20, 21, 71; and multiplexer 14 for correlators 22, 23, 73) for controlling the second variable tap-weight multipliers of the associated transversal filter.

The foregoing description shows only preferred embodiments of the present invention. Various modifications are apparent to those skilled in the art without departing from the scope of the present invention which is only limited by the appended claims.

What is claimed is:

1. An adaptive transversal equalizer for a demodulator, wherein the demodulator derives a P-channel (in-phase channel) baseband signal and a Q-channel (quadrature-channel) baseband signal from a received digitally modulated signal and recovers a clock signal synchronized with symbols contained in the baseband signals, and includes P-channel and Q-channel analog-to-digital (A/D) converters for converting said P-channel and Q-channel baseband signals, respectively, into P-channel and Q-channel digital data streams, comprising:

a frequency divider for dividing the frequency of said clock signal by N to produce a sequence of lower-frequency clock pulses, where N is an integer equal to or greater than two;

(N−1) P-channel delay means for delaying said P-channel digital data stream by one symbol interval to produce (N−1) successively delayed P-channel data streams, and (N−1) Q-channel delay means for delaying said Q-channel digital data stream by one symbol interval to produce (N−1) successively delayed Q-channel data streams;

N P-channel transversal filters and N Q-channel transversal filters, each of said transversal filters comprising a tapped-delay line, latch means having inputs respectively connected to successive taps of the tapped-delay line and clocked by the output of said frequency divider for holding symbols for a duration of N-symbol intervals, first variable tap-weight multipliers coupled respectively to the outputs of said latch means, a first adder for summing the outputs of said first tap-weight multipliers to produce a first equalized output, second variable tap-weight multipliers coupled respectively to said latch means, and a second adder for summing the outputs of said second tap-weight multipliers to produce a second equalized output, the tapped-delay line of one of the transversal filters of each of said channels being connected to the output of the A/D converter of the same channel, and the tapped-delay lines of the other transversal filters of each of said channels being connected respectively to the output of said delay means of the same channel;

N P-channel adders associated respectively with the N transversal filters of each of said channels, and N Q-channel adders associated respectively with the N transversal filters of each of said channels, each of said adders summing the first equalized output of the associated transversal filter of one of said channels with the second equalized output of the associated transversal filter of the other channel;

a P-channel multiplexer for multiplexing the outputs of said P-channel adders, and a Q-channel multiplexer for multiplexing the output of said Q-channel adders; and N pairs of P-channel correlators associated respectively with said P-channel transversal filters and further associated with said P-channel multiplexer, and N pairs of Q-channel second correlators associated respectively with said Q-channel transversal filters and further associated with said Q-channel multiplexer, one of the correlators of each of said N pairs detecting a correlation between data and error components of an output signal from the associated multiplexer for controlling the first variable tap-weight multipliers of the associated transversal filter, and the other of the correlators of each of said N pairs detecting a correlation between a data component of the output signal from the associated one of said multiplexers and an error component of an output signal from the other of said multiplexers for controlling the second variable tap-weight multipliers of the associated transversal filter.

2. An adaptive transversal equalizer as claimed in claim 1, further comprising phase shift means for shifting the phase of said lower-frequency clock pulses to produce (N−1) sequences of phase-shifted clock pulses, wherein one pair of said correlators of each of said channels is clocked with the lower-frequency clock signal from said frequency divider, and the other pairs of said correlators of each of said channels being respectively clocked with said (N−1) sequences of phase-shifted lower-frequency clock pulses.

3. A method for operating an adaptive transversal equalizer of a demodulator in a parallel mode, wherein the demodulator derives a P-channel (in-phase channel) baseband signal and a Q-channel (quadrature-channel) baseband signal from a received digitally modulated signal and recovers a clock signal synchronized with symbols contained in the baseband signals, and includes P-channel analog-to-digital (A/D) converters for converting said P-channel and Q-channel baseband signals, respectively, into P-channel and Q-channel digital data streams, the method comprising:

(a) delaying said P-channel digital data stream by one symbol interval to produce (N−1) successively delayed P-channel data streams, and delaying said Q-channel digital data stream by one symbol interval to produce (N−1) successively delayed Q-channel data streams;

(b) respectively passing the P-channel and Q-channel data streams along P-channel and Q-channel first tapped-delay lines, respectively passing the (N−1) delayed P-channel data streams along P-channel second tapped delay lines and respectively passing the (N−1) delayed Q-channel data streams along Q-channel second tapped delay lines;

(c) sampling symbols appearing at successive taps of each of the (N×2) tapped-delay lines and holding the sampled symbols for a duration of N symbols to produce first and second groups of stored symbols from each of the (N×2) tapped-delay lines;

(d) multiplying the stored symbols of the first group derived from each of said tapped-delay lines by first variable tap weights and summing the multiplied symbols of the first group to produce N P-channel first equalized outputs and N Q-channel first equalized outputs, multiplying the stored symbols of the second group derived from each of said tapped-delay lines by second variable tap weights and summing the multiplied symbols of the second group to produce N P-channel second equalized outputs and N Q-channel second equalized outputs;

(e) respectively summing the N P-channel first equalized outputs with the N Q-channel second equalized outputs to produce N P-channel summed outputs and respectively summing the N P-channel second equalized outputs with the N Q-channel first equalized outputs to produce N Q-channel summed outputs;

(f) multiplexing said N P-channel summed outputs into a P-channel output and multiplexing said N Q-channel summed outputs into a Q-channel output; and (g) detecting a correlation between data and error components of said P-channel output for controlling the first variable tap weights of an associated one of the N P-channel tapped-delay lines, detecting a correlation between a data component of said P-channel output and an error component of said Q-channel output for controlling the second variable tap weights of the associated P-channel tapped-delay line, detecting a correlation between data and error components of said Q-channel output for controlling the first variable tap weights of an associated one of the N Q-channel tapped-delay lines, and detecting a correlation between a data component of said Q-channel output and an error component of said P-channel output for controlling the second variable tap weights of the associated Q-channel tapped-delay line.

* * * * *

UNITED STATES PATENT AND TRADEMARK OFFICE
CERTIFICATE OF CORRECTION

PATENT NO. : 5,005,185
DATED : April 2, 1991
INVENTOR(S) : Shoichi MIZOGUCHI et al It is certified that error appears in the above-identified patent and that said Letters Patent is hereby corrected as shown below:

In the Abstract, line 4, delete "traversal" and insert --transversal--;

line 9, delete "traversal" and insert --transversal--;

line 20, delete "otehr" and insert --other--;

Col. 9, line 18, after "channel" insert --and Q-channel--.

Signed and Sealed this

First Day of September, 1992

Attest:

DOUGLAS B. COMER

*Attesting Officer*  *Acting Commissioner of Patents and Trademarks*